United States Patent
Ghafoor (10) Patent No.: US 10,332,360 B2
(45) Date of Patent: Jun. 25, 2019

(54) DEVICE FRAUD INDICATOR DETECTION AND REPORTING

(71) Applicant: NCR Corporation, Duluth, GA (US)

(72) Inventor: Gameelah Ghafoor, Dundee (GB)

(73) Assignee: NCR Corporation, Atlanta, GA (US)

( * ) Notice: Subject to any disclaimer, the term of this patent is extended or adjusted under 35 U.S.C. 154(b) by 463 days.

(21) Appl. No.: 14/725,886

(22) Filed: May 29, 2015

(65) Prior Publication Data

US 2016/0351022 A1 Dec. 1, 2016

(51) Int. Cl.
*G07F 19/00* (2006.01)
*G06Q 20/18* (2012.01)
*G07G 3/00* (2006.01)
*G07F 9/02* (2006.01)

(52) U.S. Cl.
CPC ......... *G07F 19/209* (2013.01); *G06Q 20/18* (2013.01); *G07F 9/026* (2013.01); *G07G 3/006* (2013.01)

(58) Field of Classification Search
CPC .................................................. G07F 19/209

USPC ......................................................... 702/183
See application file for complete search history.

(56) References Cited

U.S. PATENT DOCUMENTS

| 9,004,353 B1* | 4/2015 | Block | G06Q 20/1085 235/379 |
| 9,342,963 B1* | 5/2016 | McGraw, IV | G07F 19/00 |
| 2005/0205675 A1* | 9/2005 | Savage | G07F 19/20 235/436 |

* cited by examiner

*Primary Examiner* — Huan Hoang
*Assistant Examiner* — Muna A Techane
(74) *Attorney, Agent, or Firm* — Schwegman, Lundberg & Woessner (57) ABSTRACT

Various embodiments herein each include at least one of systems, devices and methods for detection of abnormal operation of a Self-Service Terminal (SST). One such embodiment, in the form of a method performed by a SST or remote system, includes receiving information relating to the operation of a SST. The method further includes evaluating the information to identify abnormal operation of the SST.

18 Claims, 4 Drawing Sheets

DEVICE FRAUD INDICATOR DETECTION AND REPORTING

BACKGROUND INFORMATION

Increasingly consumers are conducting financial transactions through Self-Service Terminals (SSTs) without the assistance of a teller or clerk. In fact, in many cases these transactions are conducted without any individual, other than a consumer, in the vicinity of the SSTs. In some cases, a security camera may be integrated into the SSTs or in proximity to the SSTs.

Common Self-Service Terminals include Automated Teller Machines (ATMs) and self-checkout terminals. Most SSTs are connected through a network to a remote system, which allows exchange of bank account or credit card information. An SST typically employs electronic and physical security measures to protect currency stored therein and transaction services performed thereon.

When a SST is manipulated to conduct unauthorized activity, the manipulation may not be detected until long after the act is complete. Security camera recordings may be reviewed for evidence of tampering and police may be involved to apprehend perpetrators, if they can be identified.

SUMMARY

Various embodiments herein each include at least one of systems, methods, and software for detection of abnormal operation of a Self-Service Terminal (SST).

One such embodiment, in the form of a method performed by a SST or remote system, includes receiving information relating to the operation of a SST. In various examples, the information includes operational parameters such as system reboots, initiation of new services, removal of a hard disk, detection of a new hard disk, memory usage greater than a known threshold, change in memory footprint, logging behavior, events within a transaction, usage of a prepaid card, or supervisor access. The method further includes evaluating the information to identify abnormal operation of the SST, such as evaluating two or more pieces of information in combination, identifying a sequence of events, or absence of events from a sequence, that indicate a departure from normal operation, or a combination thereof.

Another method embodiment includes detecting abnormal activity relating to a Self-Service Terminal (SST) by receiving data relating to at least two operational parameters of the SST and evaluating the data to identify an activity pattern. The method declares an alert when an identified activity pattern deviates from an expected set of operational states A further embodiment is in the form of a Self-Service Terminal (SST). The SST includes a memory and a processor executing instructions to monitor for abnormal activity on the SST. The processor evaluates activity of at least two operational parameters of the SST in combination. When abnormal activity is detected, the processors execute a responsive action.

DETAILED DESCRIPTION

Various embodiments herein each include at least one of systems, methods, and devices for identification of abnormal operation of a Self-Service Terminal (SST), such as an Automated Teller Machine (ATM). Such embodiments support the prevention or interruption of a fraud perpetrated using a SST, as opposed to mere post-fraud information gathering. As used herein, fraud refers to execution of a transaction through improper activity, e.g. by circumventing or imitating steps required to purchase or receive something of value without true authorization. This may be conducted, for example, through false identification, intrusions through electronic, physical, or software techniques ("hacks"), violating physical or electronic security measures. Prevention or interruption of fraud both preserves assets that might otherwise be lost to fraud and discourages perpetrators who are thwarted in their efforts to obtain money, objects, or services, or other items of value through fraud.

In some embodiments, a SST, remote system, or combination thereof actively monitor for indications that fraudulent, or potentially fraudulent, activity is underway. In some embodiments, a SST functions alone to monitor for fraud, i.e. the method is performed locally by the SST. In other embodiments, the SST sends information to a remote device or system that analyzes the information to determine whether the behavior is potentially fraudulent.

In some embodiments, a fraud detection is performed by both a SST and a remote system. The SST and remote system may work serially, or in parallel, or otherwise collaborate. In an example, a SST performs a first tier of evaluation and, when certain conditions are met, e.g. a potential fraud is detected the remote system performs a second tier of evaluation to further investigate whether a fraud is underway. The remote system may, for example perform more in-depth analysis of information processed by the SST, or may consider additional information obtained from the SST or elsewhere.

In some example embodiments, a SST evaluates activity and, when markers of potential-fraud are identified, triggers passage of information to a remote system for additional evaluation. The SST may also, on its own or at the command of a remote fraud detection system or human user, enters an alternate mode of operation, such as enhanced surveillance, interactive session, lock-down, or alert.

In some embodiments, actively monitoring for indicators of potentially fraudulent activity allows for recognition of a fraud (or potential fraud) while the fraud is underway. In some embodiments, a system monitors for two or more events that, when taken alone, may be benign, but, when evaluated in combination, provide an indication that operation of the SST has deviated from normal expectations, suggesting that a potential fraud is in progress.

In some example embodiments, a potential fraud is identified from a pattern of activity. In some embodiments, a SST or remote fraud detection system monitor for a sequence of events that suggest a potential fraud. For example, some embodiments monitor for more than one reset or system reboot in a period of time, in combination with one or more other operational parameters. In an example, a potential fraud is identified when two reboots or resets of the SST (or a system in or coupled to the SST) occur in ten minutes. In an example, an embodiment develops a level of confidence that a fraud is in progress based upon detected activity. For example, when two or more resets in a period of time (e.g. 10 minutes) are followed by supervisor access, the confidence that a fraud is in progress is greater. And when further followed by removal of a USB camera and subsequent supervisor access within a minute, that confidence is greater still. And when a system detect of some or all of the foregoing pattern multiple resets in a relatively short period, e.g. 10 minutes, followed by supervisor access, is followed by removal of a US camera and supervisor access, the system develops strong confidence that a fraud may be underway. In some embodiments, when a potential fraud is detected, a fraud detection system triggers a heightened state of alert, communicates an alert, initiates action to interrupt the fraud, or some combination thereof.

In an example, the SST monitors for a pattern of activity that suggests a fraud is in progress. For example, the SST may monitor for removal of a USB media device, followed by supervisor access, in combination with use of a pre-paid card in a previous transaction or subsequent transaction.

Some embodiments monitor for untypical system behavior, for example based upon application, operating system, or other software or hardware state information. For example, some example embodiments monitor for increased memory footprint when no transactions have occurred in a specified period of time (e.g. 30 minutes) and no software download is taking place.

Some embodiments, on detection of potential fraud, initiate a shutdown of the SST, take a photograph or video footage, send an alert to law enforcement, or a combination thereof.

In an example, a remote fraud detection system receives information from a SST and analyzes the information to detect instances of potential fraud, which it communicates to a SST monitoring system, the ATM, or both. In an example embodiment, the SST communicates with an APTRA™ Vision system, available from NCR Corporation. In some examples, APTRA Vision facilitates human intervention or interaction with a SST, or cooperates with a system that does so. In example embodiments, APTRA Vision communicates with a Fractals™ fraud detection system (available from NCR Corporation), which monitors SST activity or transactions. In some examples, the Fractals system communicates directly with a SST regarding transactions or detected activity.

In the following detailed description, reference is made to the accompanying drawings that form a part hereof, and in which is shown by way of illustration specific embodiments in which the inventive subject matter may be practiced. These embodiments are described in sufficient detail to enable those skilled in the art to practice them, and it is to be understood that other embodiments may be utilized and that structural, logical, and electrical changes may be made without departing from the scope of the inventive subject matter. Such embodiments of the inventive subject matter may be referred to, individually and/or collectively, herein by the term "invention" merely for convenience and without intending to voluntarily limit the scope of this application to any single invention or inventive concept if more than one is in fact disclosed.

The following description is, therefore, not to be taken in a limited sense, and the scope of the inventive subject matter is defined by the appended claims.

The functions or algorithms described herein are implemented in hardware, software or a combination of software and hardware in one embodiment. The software comprises computer executable instructions stored on computer readable media such as memory or other type of storage devices.

Further, described functions may correspond to modules, which may be software, hardware, firmware, or any combination thereof. Multiple functions are performed in one or more modules as desired, and the embodiments described are merely examples. The software is executed on a digital signal processor, ASIC, microprocessor, or other type of processor operating on a system, such as a personal computer, server, a router, or other device capable of processing data including network interconnection devices.

Some embodiments implement the functions in two or more specific interconnected hardware modules or devices with related control and data signals communicated between and through the modules, or as portions of an application-specific integrated circuit. Thus, the exemplary process flow is applicable to software, firmware, and hardware implementations.

Figure 1:
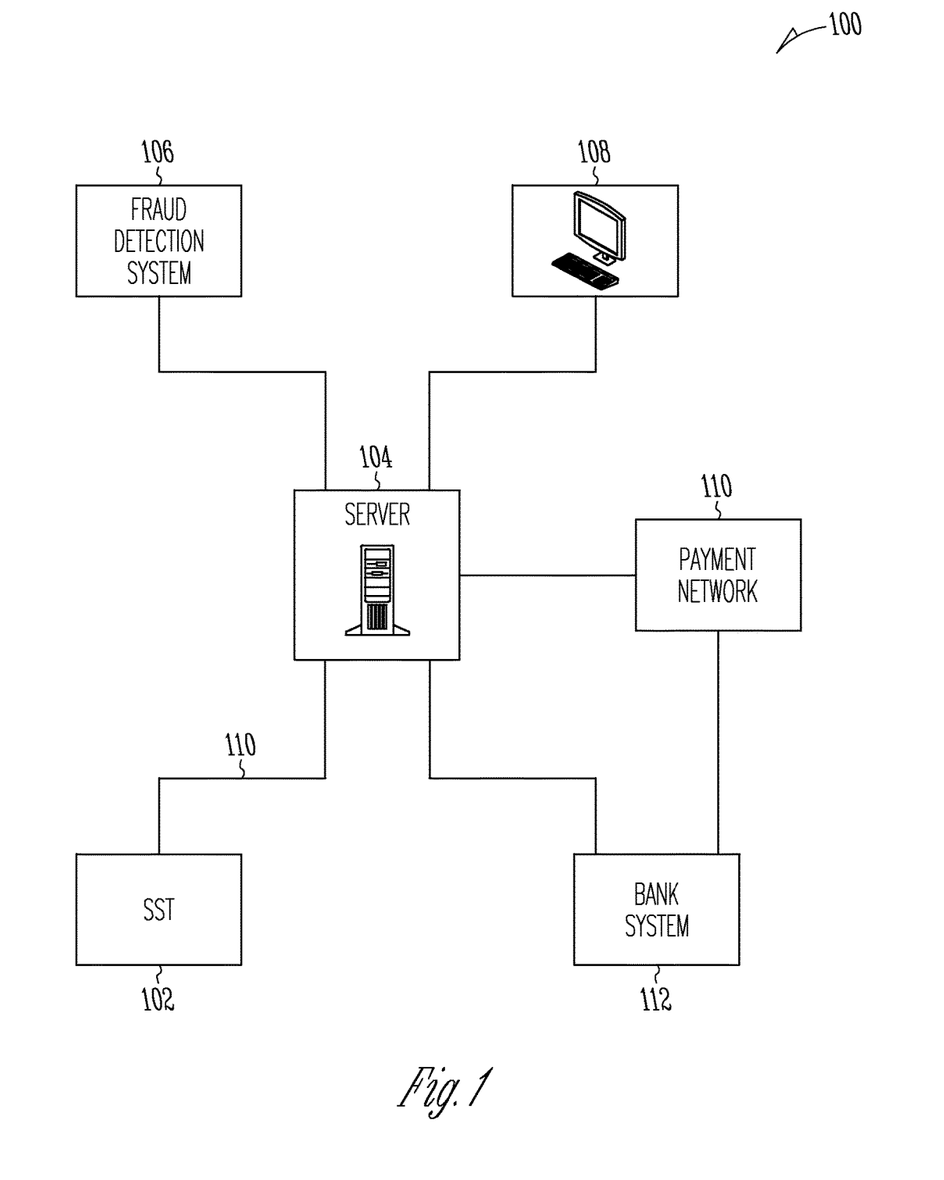
FIG. 1 is a logical block diagram of a system, according to an example embodiment.

FIG. 1 is a logical block diagram of a system 100, according to an example embodiment. The system includes a self-service terminal (SST) 102. The SST 102 is a terminal through which customers can interact and conduct transactions. In some embodiments, the SST 102 may be a self-service checkout terminal. In other embodiments, the SST 102 may be an ATM. In further embodiments, the SST 112 may be a gaming machine or other machine on which one or both of secure customer interactions and transaction may be conducted.

The SST 102 is communicatively coupled to a wired or wireless network through which it can communicate to a SST management system running on at least one server 104. The server 104 is typically connected to a network, such as the Internet, that allows processes that execute on the servers 104 to communicate with various SSTs, computers, or mobile devices. The server 104 may also be connected to a secure network, which may be dedicated at least in part to communicating with SSTs 102, such as an ATM network. The secure network 110 may rely on secure networking protocols that allow secure data to be carried on other networks, such as the Internet. However, in some embodiments, the secure network 110 may be, at least in part, a physically secured network.

The server 104 is in communication with a fraud detection system 106. In example embodiments, the SST management system is also in communication with a SST monitoring system 108, a payment network 110, e.g. credit card service providers, and a banking system 112, with which financial transactions are processed.

In an example, the SST management system 104 is APTRA™ Vision, available from NCR™. In an example, the fraud detection system is the Fractals™ system, available from NCR. The server 104 receives information about operational parameters of the SST 102 from the SST 102 and provides at least some of the information to the fraud detection system 106. The fraud detection system 106 monitors the information from the SST 102 for indicators of potential fraud. In an example, the monitoring by the fraud detection includes analyzing operational state information for deviation from expected norms, checking for an expected series of events preceding a financial transaction, or monitoring reported activity for patterns indicative of fraud.

In an example embodiment, the fraud detection system 106 communicates to the server 104 when a potential fraud is detected. In example embodiments, the server communicates to the SST 102 to initiate responsive action. In some examples, the responsive action includes collection or transfer of additional information (e.g. collect more operational data, take camera snapshots, or capture video footage), a mode change (e.g. switching to interactive mode with a remote user), suspend (or later authorize) a transaction, or shut down or block local communication with the SST.

In some examples, the fraud detection system 106 communicates directly with the SST 102. For example, the fraud detection system 106 may request more information, change mode, suspend a transaction, authorize a previously-suspended transaction, or shut down or block communication with the SST. In some examples, the fraud detection system communicates with both the server 104 and SST 102 to execute fraud detection methods or communicate or authorize transactions.

A monitoring system 108 may be in communication with the server. In an example, the monitoring system is a component or extension of a SST monitoring system running on a server 102, such as a portal running on a desktop or laptop computer, tablet, phone, or other device. In an example, the monitoring system 108 presents a human-viewable dashboard of activity at a SST 102, or a group of SSTs. In an example embodiment, a potential fraud alert is presented on the dashboard. In an example embodiment, an interactive session is accessible on the monitoring system 108 to facilitate an interactive mode with a SST 102.

Figure 2:
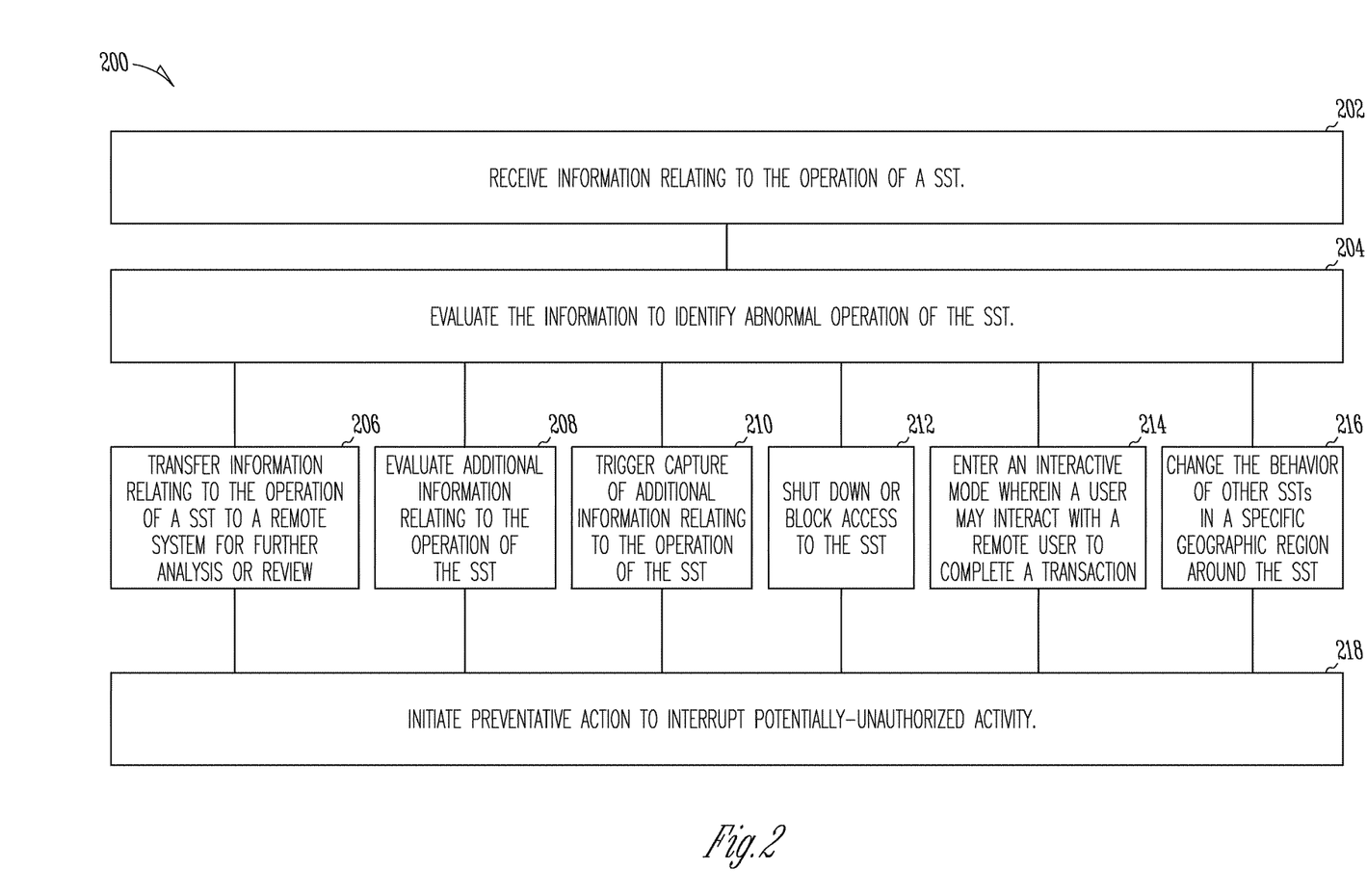
FIG. 2 is a block flow diagram of a method, according to an example, embodiment.

FIG. 2 is a block flow diagram of an example method 200 executable on example systems and devices. The method includes receiving 202 information relating to the operation of a SST.

The information is evaluated 204 to identify potentially fraudulent activity. In some example methods, a fraud detection system monitors for indicators of potentially-fraudulent activity, such as two reboots or resets within a specified period of time, especially without a corresponding authorization (e.g. field service ticket) or in conjunction with the initiation of a new service. In some examples, the evaluating 204 includes identifying a sequence of events, or absence of events from a sequence, that indicate a departure from expected (normal) operation. In some example embodiments, the method 200 includes receiving at least two qualitatively distinct pieces of information relating to the operation of the SST, and evaluating 204 the at least two qualitatively distinct pieces of information in combination. The method 200 may also include identifying two or more changes occurring within a specified timeframe. In some example embodiments, the method includes monitoring for changes of two or more of the following within a specified timeframe or under specified conditions: system reboot; initiation of new services; removal of a hard disk; detection of a new hard disk; memory usage greater than a known threshold; memory footprint; logging behavior; specified events within a transaction; usage of a prepaid card; supervisor access.

In some examples, the method 200 also includes one or more of additional steps 206, 208, 210, 2012, 214, 216 in series or parallel. At 206, the method 200 transfers information relating to the operation of a SST to a remote system for further analysis or review. While in some examples the method 200 may be executed locally on a SST, in other examples the method is executed solely on a remote fraud detection system, or jointly with cooperation between a SST and remote fraud detection system. Involvement of a remote fraud detection system allows for execution of more rigorous fraud detection algorithms and integration of information from a SST with other information, e.g. a knowledge database of prior fraudulent activity, or recent activity at other SSTs, especially if the SSTs are in near geographic proximity, suggesting a local pattern of potential fraud.

At 208 the method evaluates additional information relating to the operation of the SST. In some examples, evaluation of operational information by the SST triggers more in-depth analysis using additional information, which may come from the SST or elsewhere (e.g. other SSTs or obtained from the server. For example, the local or remote fraud detection system notices something that moves the system into a heightened detection state, where the fraud detection system evaluates more information, evaluates more frequently, or performs more in-depth analysis. In some examples, the method identifies activity as a potential fraud and the system gathers additional information to further investigate whether fraud is occurring to increase the confidence level before taking more disruptive action (e.g. initiating an interactive mode or shutting down the SST.)

At 210, the method 200 triggers capture of additional information relating to the operation of the SST. In an example, logging is increased, or operational state information is captured and relayed to the fraud detection system. In some examples, camera, audio, or video information is captured.

At 212, the method 200 shuts down or blocks access to the SST. If a fraud or potential fraud is identified, the fraud may be stopped by disrupting operation of the SST. For example, electronic or physical access to the SST may be blocked by locking the system, or the system may be shut down completely, or certain functions (e.g. dispensing an item such as cash) may be blocked.

At 214, the method 200 initiates an interactive mode. In an example, a SST user communicates with a person in a remote location using a text chat system, audio system, or video system.

At 216, the method 200 changes the behavior of other SSTs in a specific geographic region around the SST. In an example, when a pattern of potential fraud is detected at a SST, fraud detection at other SSTs is modified to account for the identified pattern. In an example, when a pattern of potential fraud is detected at a SST, additional data collection, such as video streaming or capture, is initiated at other SSTs. This may enable, for example, detection of fraud at other SSTs or identification of a fraud perpetrator who attacks multiple systems.

These various actions may occur in combination, e.g. additional information may be evaluated 208, leading to capture of additional information 210 and transfer of information to a remote system 206, which may lead to initiation of interactive mode 214 or system shut-down 212. Other combinations are possible.

At 218, the method 200 includes taking action to interrupt potentially-unauthorized activity. In an example, the method 200 includes triggering an alert at the SST, which may include notification of police or other authorities, biometric capture (e.g. photograph, audio, video, fingerprint, facial recognition, etc.), creating a visual or audio disturbance (e.g. flashing lights or sounds), shutting down or blocking access to the SST.

Figure 3:
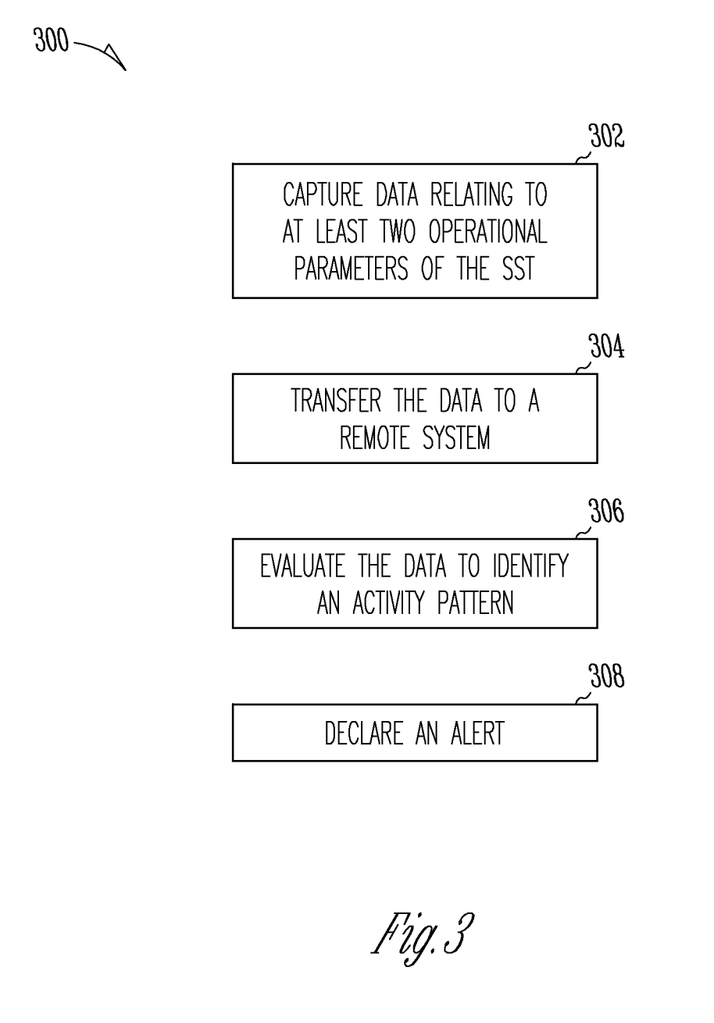
FIG. 3 is a block flow diagram of a method, according to an example, embodiment.

FIG. 3 is a block flow diagram of an example method 300 executable on example systems and devices. The method includes capturing 302 data relating to at least two operational parameters of the SST. When the method is executed partially or completely on one more remote systems, data is transferred 304 from the SST to the remote system. In some examples, the method is performed on a SST, so the transfer occurs locally between components installed at a SST, or the transfer 304 is omitted and the subsequent steps occur within the SST system that captured the data. In some examples, information is collected locally and sent to a remote fraud detection system for analysis. In another example, the SST runs local fraud detection system and, if potentially fraudulent activity is detected, the local fraud detection system sends information for further analysis by a remote fraud detection system, which may perform more in depth analysis, request additional information from the SST, or trigger an alert.

The method 300 further includes evaluating 306 the data to identify an activity pattern. In an example, the method includes checking for a series of expected events leading up to an event, such as the dispensing of an item (e.g. cash, valuables, stamps, gift cards, services, or a printed bar code that can be exchanged for goods or services.) The method may include, for example, checking for the presence of a log, or the contents of the log. The method may also include evaluating changes in state, memory usage, and hardware configuration. In some examples, the method monitors for a pattern of activity of events or states that in insolation may seem benign, but in combination indicate fraud, or potential fraud. For example, the method may evaluate a combination system reboot; initiation of new services; removal of a hard disk; detection of a new hard disk; memory usage greater than a known threshold; memory footprint; logging behavior; events within a transaction; usage of a prepaid card; and supervisor access.

The method further includes 300 triggering 308 an alert. In an example, declaring the alert 308 sends a notification to a management system. In another example, declaring the alert 308 triggers collection or analysis of additional information or transfer of information to a remote fraud detection system. In another example, declaring the alert 308 notifies authorities (e.g. police or security personnel) that a potentially-fraudulent event is in progress. In another example, declaring the alert 308 changes the behavior of the SST, or other SSTs in geographic proximity to the SST.

Figure 4:
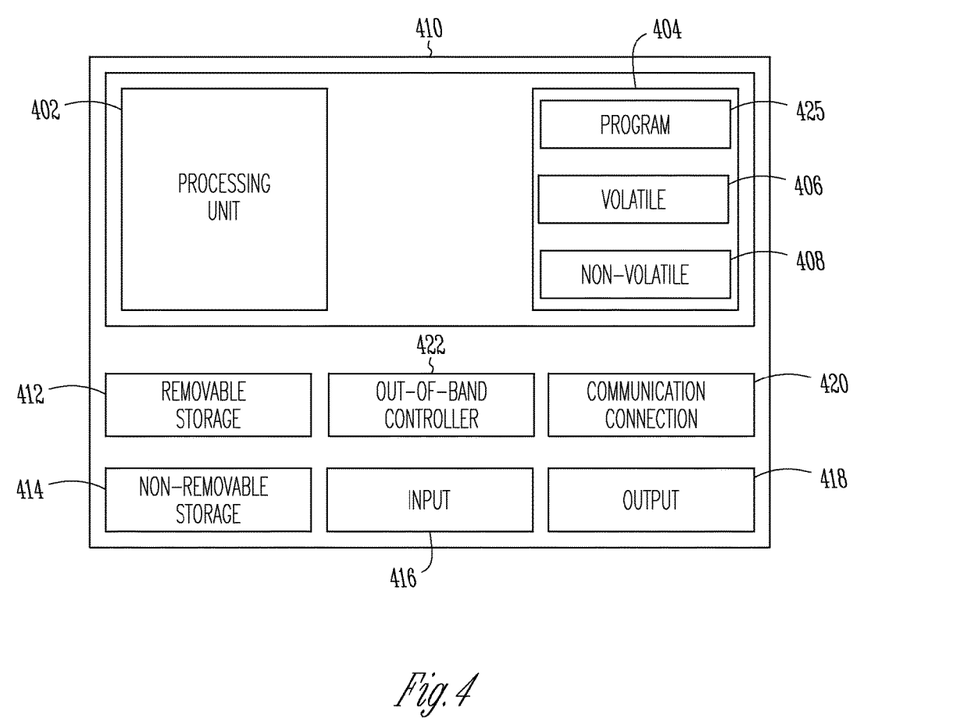
FIG. 4 is a block diagram of a computing device, according to an example embodiment.

FIG. 4 is a block diagram of a computing device, according to an example embodiment. In one embodiment, multiple such computer systems are utilized in a distributed network to implement multiple components in a transaction-based environment. An object-oriented, service-oriented, or other architecture may be used to implement such functions and communicate between the multiple systems and components. One example computing device in the form of a computer 410, may include a processing unit 402, memory 404, removable storage 412, and non-removable storage 414. Although the example computing device is illustrated and described as computer 410, the computing device may be in different forms in different embodiments. For example, the computing device may instead be a smartphone, a tablet, smartwatch, or other computing device including the same or similar elements as illustrated and described with regard to FIG. 4. Devices such as smartphones, tablets, and smartwatches are generally collectively referred to as mobile devices. Further, although the various data storage elements are illustrated as part of the computer 410, the storage may also or alternatively include cloud-based storage accessible via a network, such as the Internet.

Returning to the computer 410, memory 404 may include volatile memory 406 and non-volatile memory 408. Computer 410 may include—or have access to a computing environment that includes a variety of computer-readable media, such as volatile memory 406 and non-volatile memory 408, removable storage 412 and non-removable storage 414. Computer storage includes random access memory (RAM), read only memory (ROM), erasable programmable read-only memory (EPROM) and electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions.

Computer 410 may include or have access to a computing environment that includes input 416, output 418, and a communication connection 420. The input 416 may include one or more of a touchscreen, touchpad, mouse, keyboard, camera, one or more device-specific buttons, one or more sensors integrated within or coupled via wired or wireless data connections to the computer 410, and other input devices. The computer 410 may operate in a networked environment using a communication connection 420 to connect to one or more remote computers, such as database servers, web servers, and other computing device. An example remote computer may include a personal computer (PC), server, router, network PC, a peer device or other common network node, or the like. The communication connection 420 may be a network interface device such as one or both of an Ethernet card and a wireless card or circuit that may be connected to a network. The network may include one or more of a Local Area Network (LAN), a Wide Area Network (WAN), the Internet, and other networks. In some embodiments, the communication connection 420 may also or alternatively include a transceiver device, such as a BLUETOOTH® device that enables the computer 410 to wirelessly receive data from and transmit data to other BLUETOOTH® devices. Computer 410 also typically includes an out-of-band controller 422.

Computer-readable instructions stored on a computer-readable medium are executable by the processing unit 402 of the computer 410. A hard drive (magnetic disk or solid state), CD-ROM, and RAM are some examples of articles including a non-transitory computer-readable medium. For example, various computer programs 425 or apps, such as one or more applications and modules implementing one or more of the methods illustrated and described herein or an app or application that executes on a mobile device or is accessible via a web browser, may be stored on a non-transitory computer-readable medium.

It will be readily understood to those skilled in the art that various other changes in the details, material, and arrangements of the parts and method stages which have been described and illustrated in order to explain the nature of the inventive subject matter may be made without departing from the principles and scope of the inventive subject matter as expressed in the claims.

What is claimed is:

1. A processor-implemented method of identifying and responding to abnormal operation of a Self-Service Terminal (SST), comprising:

receiving, by a hardware server, information relating to the operation of a SST, wherein receiving further includes identifying the information as a sequence of actions taken during a transaction at the SST, the sequence of actions include two or more events on the SST, the two or more events selected from: an SST reboot operation, initiating of new services being executed on the SST, removal of a hard disk, detection of a newly added hard disk, memory usage greater than a threshold, a memory footprint, a logging activity, transaction events associated with the transaction, usage of a prepaid card with the transaction, and supervisory mode of operation on the SST;

evaluating, by the hardware server, the information to identify abnormal operation of the SST that is consistent with one or more markers of potential fraud, wherein evaluating further includes identifying the abnormal condition based on the two or more events appearing together with the sequence of the actions and when just one of the two or more events appear in the sequence of actions identifying a benign condition for the SST; and responsive to identification markers of potential fraud, initiating, by the hardware server, a response through the an electronic network, wherein initiating a response includes activating an interactive mode with a user interacting interact with a remote user at the SST to complete the transaction.

2. The method of claim 1, wherein evaluating the information to identify abnormal operation of the SST comprises identifying an absence of expected events from the sequence of actions that indicate a departure from a normal operation of the SST during the transaction.

3. The method of claim 1, wherein receiving information relating to the operation of a SST comprises receiving at least two qualitatively distinct pieces of information relating to the operation of the SST, and evaluating the information to identify abnormal operation of the SST comprises evaluating the at least two qualitatively distinct pieces of information in combination.

4. The method of claim 1, wherein evaluating the information to identify abnormal operation of the SST comprises monitoring for an increase in the memory footprint when no transactions have occurred in a specified period of time and no software download is taking place.

5. The method of claim 1, further comprising sending information relating to the operation of a SST to a remote system for further analysis or review, and receiving a command from the remote system to initiate preventative action to interrupt potentially-unauthorized activity.

6. The method of claim 1, wherein initiating a response includes at least one of evaluating additional information relating to the operation of the SST, triggering capture of additional information relating to the operation of the SST, transferring information about operation of the SST to another device or system for further analysis, shutting down or blocking access to the SST, and entering a specified mode of operation.

7. The method of claim 1, wherein initiating a response includes changing the behavior of other SSTs in a specific geographic region around the SST.

8. A method of detecting and responding to abnormal activity relating to Self-Service Terminal (SST) comprising:
receiving, by a hardware server, data relating to at least two operational parameters of the SST, wherein the data for the at least two operational parameters selected from: an SST reboot operation, initiating of new services being executed on the SST, removal of a hard disk, detection of a newly added hard disk, memory usage greater than a threshold, a memory footprint, a logging activity, and supervisory mode of operation on the SST;
evaluating, by the hardware server, the data to identify an activity pattern that includes the at least two operational parameters together in combination and when just one of the at least two operational parameters occur without a remaining one of the at least two operational parameters are present identifying a benign condition for the SST;
detecting, by the hardware server, a potential fraud based at least in part on a deviation of the activity pattern deviates from an expected set of operational states; and responsive to detection of the potential fraud, initiating a response includes activating an interactive mode wherein a user may interact with a remote user to complete a transaction.

9. The method of claim 8, wherein evaluating the data to identify an activity pattern comprises ascertaining whether an expected series of events occur before a specified event.

10. The method of claim 9, wherein the specified event is the dispensing of an item and the expected series of events comprise expected authorizing activity leading up to the dispensing of an item.

11. The method of claim 8, wherein the evaluating the data comprises evaluating at least two of changes in a state of the SST, memory usage on the SST, and hardware configuration for the SST.

12. The method of claim 8, further comprising capturing additional data relating to the operational parameters of the SST using the SST and transferring the additional data from the SST to a remote system, wherein the receiving the data, evaluating the data, and declaring an alert are processed on the remote system that is remote from the SST.

13. A self-service terminal system comprising:
a hardware server; and
a self-service terminal that includes:
a memory;
a processor executing instructions to monitor for abnormal activity on the SST, the processor operable to evaluate activity of at least two operational parameters of the SST in combination for one or markers of potentially-fraudulent activity and execute a responsive action when abnormal activity indicative of potential fraud is detected, wherein executing a responsive action includes activating an interactive mode wherein a user may interact with a remote user using the hardware server to complete a transaction, wherein the activity of the at least two operational parameters selected from: an SST reboot operation, initiating of new services being executed on the SST, removal of a hard disk, detection of a newly added hard disk, memory usage greater than a threshold, a memory footprint, a logging activity, transaction events associated with a transaction on the SST, usage of a prepaid card with the transaction, and supervisory mode of operation on the SST, wherein when the at least two operational parameters together in combination the abnormal activity is identified, and when just one of the at least two operational parameters occur without a remaining one of the at least two operational parameters are present a benign condition for the SST is identified.

14. The self-service terminal system of claim 13, wherein the processor is operable to initiate capture of additional information in response to detection of abnormal activity.

15. The self-service terminal system of claim 13, wherein the processor is operable to, prior to dispensing cash, evaluate whether the activity of the at least two operational parameters of the SST indicate abnormal activity, and refrain from dispensing cash when abnormal activity is detected.

16. The self-service terminal system of claim 13, further comprising a network connection, wherein the processor is further operable to initiate transfer of information to a remote system when abnormal activity indicative of potential fraud is detected.

17. The self-service terminal system of claim 16, wherein the processor is further operable to receive an instruction from a remote system to change the behavior of the SST, the change in behavior comprising at least one evaluating additional information relating to the operation of the SST, triggering capture of additional information relating to the operation of the SST, sending information about operation of the SST to a remote device or system for further analysis, shutting down or blocking access to the SST, and entering an interactive mode.

18. The self-service terminal system of claim 13, wherein the SST is an Automated Teller Machine (ATM).

* * * * *